US012631406B2

(12) United States Patent
Brodeur et al.

(10) Patent No.: US 12,631,406 B2
(45) Date of Patent: May 19, 2026

(54) ELECTRIC ARRANGEMENT, PANEL AND HEAT EXCHANGER

(71) Applicant: HITACHI ENERGY LTD, Zürich (CH)

(72) Inventors: Samuel Brodeur, St-Bruno-de-Montarville (CA); Miguel Aguirre, Cordova (ES); Rebei Bel Fdhila, Västerås (SE); Frederic Tholence, Gothenburg (SE); Ulf Sand, Västerås (SE); Saeed Maleksaeedi, Waterloo (CA)

(73) Assignee: HITACHI ENERGY LTD, Zürich (CH)

( * ) Notice: Subject to any disclaimer, the term of this patent is extended or adjusted under 35 U.S.C. 154(b) by 412 days.

(21) Appl. No.: 17/918,984

(22) PCT Filed: Mar. 26, 2021

(86) PCT No.: PCT/EP2021/057936
§ 371 (c)(1),
(2) Date: Oct. 14, 2022

(87) PCT Pub. No.: WO2021/219305
PCT Pub. Date: Nov. 4, 2021

(65) Prior Publication Data

US 2023/0314094 A1 Oct. 5, 2023

(30) Foreign Application Priority Data

Apr. 30, 2020 (EP) .................................... 20172413

(51) Int. Cl.

| | |
|---|---|
| ***H01F 27/12*** | (2006.01) |
| ***F28F 7/02*** | (2006.01) |
| ***F28F 13/12*** | (2006.01) |

(52) U.S. Cl.
CPC ................ *F28F 7/02* (2013.01); *F28F 13/12* (2013.01); *H01F 27/12* (2013.01); *F28F 2210/02* (2013.01); *F28F 2250/102* (2013.01)

(58) Field of Classification Search
CPC ........ B33Y 80/00; H01F 27/12; H01F 27/125
See application file for complete search history.

(56) References Cited

U.S. PATENT DOCUMENTS

| | | | | |
|---|---|---|---|---|
| 4,302,793 A * | 11/1981 | Rohner | .............. | H05K 7/20272 361/689 |
| 6,623,687 B1 * | 9/2003 | Gervasi | .................. | B29C 64/40 264/401 |

(Continued)

FOREIGN PATENT DOCUMENTS

| | | | |
|---|---|---|---|
| CN | 1416580 A | | 5/2003 |
| CN | 204555743 U | * | 8/2015 |

(Continued)

OTHER PUBLICATIONS

International Search Report and Written Opinion of the International Searching Authority, PCT/EP2021/057936, mailed Jun. 4, 2021 12 pages.

(Continued)

*Primary Examiner* — Eric S Ruppert
(74) *Attorney, Agent, or Firm* — Sage Patent Group

(57) ABSTRACT

An electric arrangement comprising a casing; a heat generating electric component arranged inside the casing; and a heat exchanger comprising a three dimensional lattice cell structure, the three dimensional lattice cell structure being arranged to conduct a dielectric cooling fluid from the casing at an exterior side of the casing for heat exchange with an ambient fluid, and back towards the casing for cooling of the (Continued)

electric component. A panel for a heat exchanger and a heat exchanger comprising a plurality of panels are also provided.

15 Claims, 9 Drawing Sheets

(56) References Cited

U.S. PATENT DOCUMENTS

| | | | | |
|---|---|---|---|---|
| 2013/0058042 | A1 | 3/2013 | Salamon et al. | |
| 2017/0030519 | A1* | 2/2017 | Kuczek | F28F 3/086 |
| 2018/0187984 | A1 | 7/2018 | Manzo | |
| 2018/0270987 | A1 | 9/2018 | Yuan et al. | |
| 2020/0001670 | A1 | 1/2020 | Angermann et al. | |
| 2020/0033070 | A1 | 1/2020 | Mahinos et al. | |
| 2021/0172567 | A1* | 6/2021 | Kang | B21F 27/12 |

FOREIGN PATENT DOCUMENTS

| | | | | |
|---|---|---|---|---|
| EP | 2079086 | A2 * | 7/2009 | F28D 1/024 |
| EP | 2466086 | A1 | 6/2012 | |
| EP | 3431911 | A1 | 1/2019 | |
| JP | H0567890 | A | 3/1993 | |
| JP | 2003524893 | A | 8/2003 | |
| WO | WO-2019198917 | A1 * | 10/2019 | B21F 27/128 |

OTHER PUBLICATIONS

Office Action, Japanese Patent Application No. 2022-566291, mailed Dec. 12, 2023, 14 pages.

Indian Office Action, IN Application No. 202247060969, mailed Dec. 28, 2022, 5 pages.

Notice of Grant, Japanese Patent Application No. 2022-566291, mailed May 7, 2024, 6 pages.

First Office Action, CN Patent Application No. 202180031335.8, mailed Mar. 21, 2025, 9 pages.

* cited by examiner

ELECTRIC ARRANGEMENT, PANEL AND HEAT EXCHANGER

CROSS REFERENCE TO RELATED APPLICATIONS

This application is a 35 U.S.C. § 371 national stage application of PCT International Application No. PCT/EP2021/057936 filed on Mar. 26, 2021, which in turn claims priority to European Patent Application No. 20172413.5, filed on Apr. 30, 2020, the disclosures and content of which are incorporated by reference herein in their entireties.

TECHNICAL FIELD

The present disclosure generally relates to heat exchangers for electric arrangements. In particular, an electric arrangement comprising a heat exchanger, a panel for a heat exchanger, and a heat exchanger comprising a plurality of panels, are provided.

BACKGROUND

Transformer oil used in power transformers is often cooled by cooling arrangements, such as radiators or coolers. These cooling arrangements often constitute a significant part of the footprint of the transformer.

US 2020033070 A1 discloses a heat exchanger including an enclosure and a minimal surface structure within the enclosure. The enclosure includes a first inlet, a first outlet, a second inlet, and a second outlet. The minimal surface structure separates a first volume and a second volume within the enclosure. The first inlet and the first outlet are in fluid communication with the first volume, and the second inlet and a second outlet are in fluid communication with the second volume. The first and second volumes are separated from mixing with each other.

SUMMARY

One object of the present disclosure is to provide an electric arrangement comprising a heat generating electric component and a heat exchanger, which electric arrangement enables an improved cooling of the electric component.

A further object of the present disclosure is to provide an electric arrangement comprising a heat exchanger, which electric arrangement enables simple maintenance.

A still further object of the present disclosure is to provide an electric arrangement comprising a heat exchanger, which electric arrangement has a compact design.

A still further object of the present disclosure is to provide an electric arrangement comprising a heat exchanger, which electric arrangement has a low weight.

A still further object of the present disclosure is to provide an electric arrangement comprising a heat exchanger, which electric arrangement requires low amounts of dielectric cooling fluid.

A still further object of the present disclosure is to provide an electric arrangement comprising a heat exchanger, which electric arrangement solves several or all of the foregoing objects in combination.

A still further object of the present disclosure is to provide a panel for a heat exchanger, which panel solves one, several or all of the foregoing objects.

A still further object of the present disclosure is to provide a heat exchanger for an electric arrangement, which heat exchanger solves one, several or all of the foregoing objects.

According to one aspect, there is provided an electric arrangement comprising a casing; a heat generating electric component arranged inside the casing; and a heat exchanger comprising a three dimensional lattice cell structure, the three dimensional lattice cell structure being arranged to conduct a dielectric cooling fluid from the casing at an exterior side of the casing for heat exchange with an ambient fluid, and back towards the casing for cooling of the electric component.

The three dimensional lattice cell structure increases the surface areas exposed for heat transfer. Heat transfer efficiency is thus improved by means of the three dimensional lattice cell structure. Consequently, cooling efficiency of the electric component is also improved. Due to the high heat transfer efficiency of the heat exchanger, the amount of cooling fluid can also be relatively low. The three dimensional lattice cell structure further provides a good mixing environment and a low increase of pressure drop.

The three dimensional lattice cell structure further enables a compact design of the heat exchanger. As a consequence, also the electric arrangement can be made more compact. Alternatively, the electric arrangement can be made more powerful with the same footprint.

Furthermore, by means of the three dimensional lattice cell structure, the electric arrangement can be made lighter. This in turn reduces transportation costs. The three dimensional lattice cell structure also enables the electric arrangement to be manufactured more easily.

The three dimensional lattice cell structure may comprise a periodic pattern in each of three different directions. Each periodic pattern may comprise at least three periods. The directions may be substantially orthogonal, or orthogonal. The three dimensional lattice cell structure comprises a plurality of cells. The cells may be arranged substantially orthogonally, or orthogonally, in two or three directions.

The three dimensional lattice cell structure may define an interior lattice cell structure volume. The interior lattice cell structure volume may be continuous or discontinuous. Thus, the interior lattice cell structure volume may form a continuous labyrinth network for the cooling fluid, or may form several parallel labyrinth networks for the cooling fluid. In any case, the interior lattice cell structure volume may be in fluid communication with the interior of the casing.

The three dimensional lattice cell structure may define an exterior lattice cell structure volume. The exterior lattice cell structure volume may be continuous or discontinuous. Thus, the exterior lattice cell structure volume may form a continuous labyrinth network for the ambient fluid, or may form several parallel labyrinth networks for the ambient fluid. In any case, the exterior lattice cell structure volume may be in fluid communication with the ambient fluid.

The cooling fluid may be a dielectric liquid, such as dielectric oil. The ambient fluid may be ambient air or water.

The casing and the three dimensional lattice cell structure may define a circuit for the cooling fluid. The heat exchanger may comprise one or more inlets and one or more outlets. In this case, the three dimensional lattice cell structure may be arranged fluidly between the one or more inlets and the one or more outlets. Each inlet and each outlet may be arranged fluidly between the casing and the three dimensional lattice cell structure. The inlet may be arranged geodetically higher than the outlet.

The casing may comprise a plurality of walls. The three dimensional lattice cell structure may be embedded in one of the walls. Alternatively, or in addition, the three dimensional lattice cell structure may be welded or bolted to one of the walls.

The heat exchanger may comprise a plurality of bodies, each body comprising a three dimensional lattice cell structure or a two dimensional lattice structure. Each body may be integrally formed. For example, each body may be additively manufactured. One example of additive manufacture is 3D printing.

Each body may be detachably connected to the casing. This lowers assembly time and facilitates repair. For example, one of the bodies may be replaced without replacing the remaining bodies. One reason for needing replacement may be leakage.

Each body may be a panel comprising a two dimensional lattice cell structure. The two dimensional lattice cell structure may comprise a periodic pattern in each of two different directions. Each periodic pattern may comprise at least three periods. The directions may be substantially orthogonal, or orthogonal.

The panels may be arranged in a stack to form the three dimensional lattice cell structure. In this case, cells of adjacent panels may be aligned or offset. Alternatively, each body may be elongated, such as pipe-shaped.

The three dimensional lattice cell structure may comprise a triply periodic substantially minimal surface, such as a triply periodic minimal surface, TPMS. The TPMS may for example comprise a Schwarz P surface. The triply periodic substantially minimal surface may be a surface that is similar to a TPMS, but that does not fulfill the requirement to be named TPMS.

The three dimensional lattice cell structure may comprise non-flat and flow-promoting ends. The ends may for example be cones or hemispheres. Each end may close a respective cell of the three dimensional lattice cell structure.

The heat exchanger may comprise two three dimensional lattice cell structures arranged in parallel, and each three dimensional lattice cell structure may be arranged to conduct the cooling fluid from the casing at the exterior side of the casing for heat exchange with an ambient fluid, and back towards the casing for cooling of the electric component. In this case, the heat exchanger may comprise a plurality of inlets and a plurality of outlets. Each pair of an inlet and an outlet may be associated with one three dimensional lattice cell structure. Each three dimensional lattice cell structure may be arranged fluidly between the associated inlet and outlet.

The heat exchanger may further comprise pipes for conducting the ambient fluid through the three dimensional lattice cell structure. In this case, the ambient fluid may flow through the three dimensional lattice cell structure both inside and outside the pipes. That is, the ambient fluid may flow both inside the pipes and inside the exterior lattice cell structure volume. This further increases the heat transfer between the cooling fluid and the ambient fluid. The pipes may extend through cells of the three dimensional lattice cell structure.

As an alternative, the pipes may be heat pipes containing two-phase coolant. In this case, an interior surface of the heat pipes may comprise a capillary structure. Sections of the heat pipes outside the three dimensional lattice cell structure may constitute a condenser region and sections of the heat pipes inside the three dimensional lattice cell structure may constitute an evaporator region. In the evaporator region of the heat pipes adjacent to the cooling fluid, the two-phase coolant absorbs heat from the cooling fluid and evaporates. The vapour travels inside the heat pipes, but outside the capillary structure, to the lower temperature condenser region of the heat pipes outside the three dimensional lattice cell structure, where the vapour condenses back to liquid and is absorbed by the capillary structure. The liquid then travels inside the capillary structure from the condenser region back to the evaporator region.

The heat exchanger may comprise a guiding structure inside the three dimensional lattice cell structure, the guiding structure being arranged to guide the cooling fluid along a defined path inside the three dimensional lattice cell structure. The path may pass through substantially the entire, or the entire, three dimensional lattice cell structure. The path may be a serpentine path. The guiding structure may comprise a plurality of plates.

The electric arrangement may further comprise a pump arrangement arranged to generate a flow of the cooling fluid through the three dimensional lattice cell structure. This further improves the heat exchange. The pump arrangement may comprise one or more pumps. Alternatively, the electric arrangement may be configured to circulate the cooling fluid only by means of natural convection, i.e., without any mechanical assistance for circulating the cooling fluid.

The electric arrangement may further comprise a fan arrangement arranged to generate a flow of the ambient fluid in the three dimensional lattice cell structure. This further improves the heat exchange. The fan arrangement may be arranged to generate a flow of the ambient fluid through the three dimensional lattice cell structure. The fan arrangement may comprise one or more fans.

The fan arrangement may be arranged to generate a flow of the ambient fluid in the three dimensional lattice cell structure in at least two different directions, such as in at least three different directions. The directions may be substantially orthogonal, or orthogonal.

The electric arrangement may be a high voltage static electric induction system, such as a power transformer or a shunt reactor. As used herein, a high voltage may be at least 30 kV, such as at least 100 kV. Although the electric arrangement is mainly described as a power transformer, the electric arrangement is not limited to a power transformer.

According to a further aspect, there is provided a panel for a heat exchanger, the panel comprising an inlet, an outlet and a two dimensional lattice cell structure fluidly between the inlet and the outlet. The panel may be of any type according to the present disclosure.

According to a further aspect, there is provided a heat exchanger for an electric arrangement, the heat exchanger comprising a plurality of panels according to the present disclosure, the panels being arranged in a stack to form a three dimensional lattice cell structure. Cells of adjacent panels may be aligned or offset.

Each panel may comprise a two dimensional lattice cell structure. The two dimensional lattice cell structure may comprise a periodic pattern in each of two different directions. Each periodic pattern may comprise at least three periods. The directions may be substantially orthogonal, or orthogonal.

BRIEF DESCRIPTION OF THE DRAWINGS

Further details, advantages and aspects of the present disclosure will become apparent from the following embodiments taken in conjunction with the drawings, wherein.

DETAILED DESCRIPTION

Figure 1:
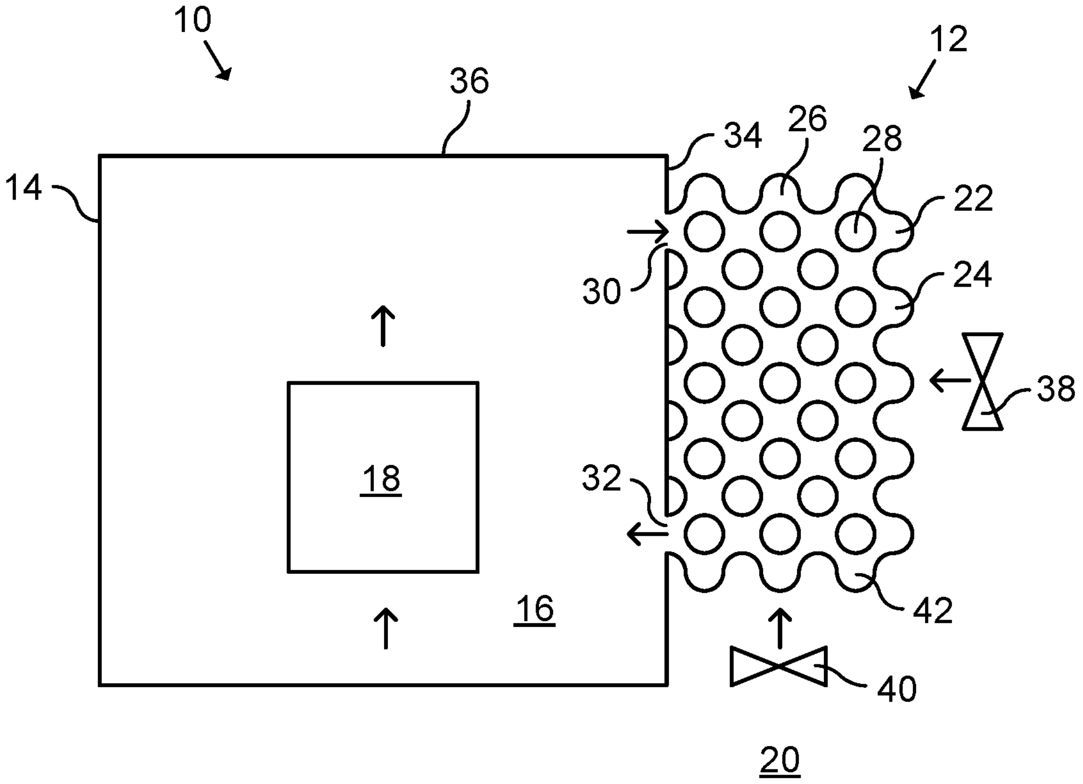
FIG. 1: schematically represents a side view of an electric arrangement comprising a heat exchanger.

In the following, an electric arrangement comprising a heat exchanger, a panel for a heat exchanger, and a heat exchanger comprising a plurality of panels, will be described. The same or similar reference numerals will be used to denote the same or similar structural features.

FIG. 1 schematically represents a side view of a power transformer 10 comprising a heat exchanger 12. The power transformer 10 is one example of an electric arrangement. The power transformer 10 comprises a casing 14. The casing 14 contains dielectric oil 16. Dielectric oil 16 is one example of a dielectric cooling fluid.

The power transformer 10 further comprises an electric component 18. The electric component 18 is arranged inside the casing 14. The electric component 18 is submerged in the oil 16. The electric component 18 generates heat during operation of the power transformer 10. The electric component 18 may for example be a winding of the power transformer 10.

FIG. 1 further indicates ambient air 20 outside the casing 14. The air 20 may be the atmosphere. The air 20 is one example of an ambient fluid.

The heat exchanger 12 comprises a three dimensional lattice cell structure 22. The three dimensional lattice cell structure 22 comprises a plurality of cells 24. The three dimensional lattice cell structure 22 of this example comprises a triply periodic substantially minimal surface having an elongated Schwarz P surface. The three dimensional lattice cell structure 22 may be for example be 3D printed.

The three dimensional lattice cell structure 22 defines an interior lattice cell structure volume 26 and an exterior lattice cell structure volume 28. The interior lattice cell structure volume 26 and the exterior lattice cell structure volume 28 constitute two separate networks. Oil 16 from the interior of the casing 14 can flow into and out from the interior lattice cell structure volume 26. The air 20 can flow into and out from the exterior lattice cell structure volume 28. In this example, each of the interior lattice cell structure volume 26 and the exterior lattice cell structure volume 28 is continuous.

The three dimensional lattice cell structure 22 is thus configured to conduct the oil 16 from the casing 14 to an exterior side of the casing 14 and back towards the casing 14. The three dimensional lattice cell structure 22 comprises large surface areas for heat exchange between the oil 16 and the air 20. Tests have shown that the heat exchanger 12 has a very high heat transfer coefficient. A number of radiators can thereby be reduced. Despite the large surface areas for heat exchange, the three dimensional lattice cell structure 22 is also compact.

The heat exchanger 12 comprises an inlet 30 and an outlet 32. Each of the inlet 30 and the outlet 32 is arranged fluidly between the casing 14 and the three dimensional lattice cell structure 22. The inlet 30 is arranged geodetically higher than the outlet 32.

As shown in FIG. 1, the casing 14 and the three dimensional lattice cell structure 22 define a circuit for the oil 16 comprising the casing 14, the inlet 30, the three dimensional lattice cell structure 22 and the outlet 32. In FIG. 1, the oil 16 flows in this circuit in a clockwise direction during operation of the power transformer 10, as indicated with arrows. That is, the oil 16 is heated by the electric component 18. The hot oil 16 then enters the three dimensional lattice cell structure 22 through the inlet 30. The hot oil 16 in the interior lattice cell structure volume 26 is then cooled by heat exchange with the air 20 in the exterior lattice cell structure volume 28. Cold oil 16 then exits the three dimensional lattice cell structure 22 through the outlet 32. The electric component 18 is then cooled by the cold oil 16.

The casing 14 comprises four side walls 34 and a top wall 36. In the example in FIG. 1, the three dimensional lattice cell structure 22 is embedded in one of the side walls 34. The three dimensional lattice cell structure 22 may for example be welded or bolted to the side wall 34.

The power transformer 10 further comprises a fan arrangement. The fan arrangement comprises a front fan 38 and a bottom fan 40. The front fan 38 is configured to blow the air 20 horizontally into the three dimensional lattice cell structure 22. The bottom fan 40 is configured to blow the air 20 vertically into the three dimensional lattice cell structure 22 from below. The cooling efficiency of the power transformer 10 can easily be regulated by adjusting the speeds of the fans 38, 40. The fan arrangement may also comprise a further fan (not shown) that blows the air 20 in a further horizontal direction, perpendicular to the blowing direction of the front fan 38.

The three dimensional lattice cell structure 22 further comprises non-flat and flow-promoting ends 42. Each end 42 closes a respective cell 24 of the three dimensional lattice cell structure 22.

Figure 2:
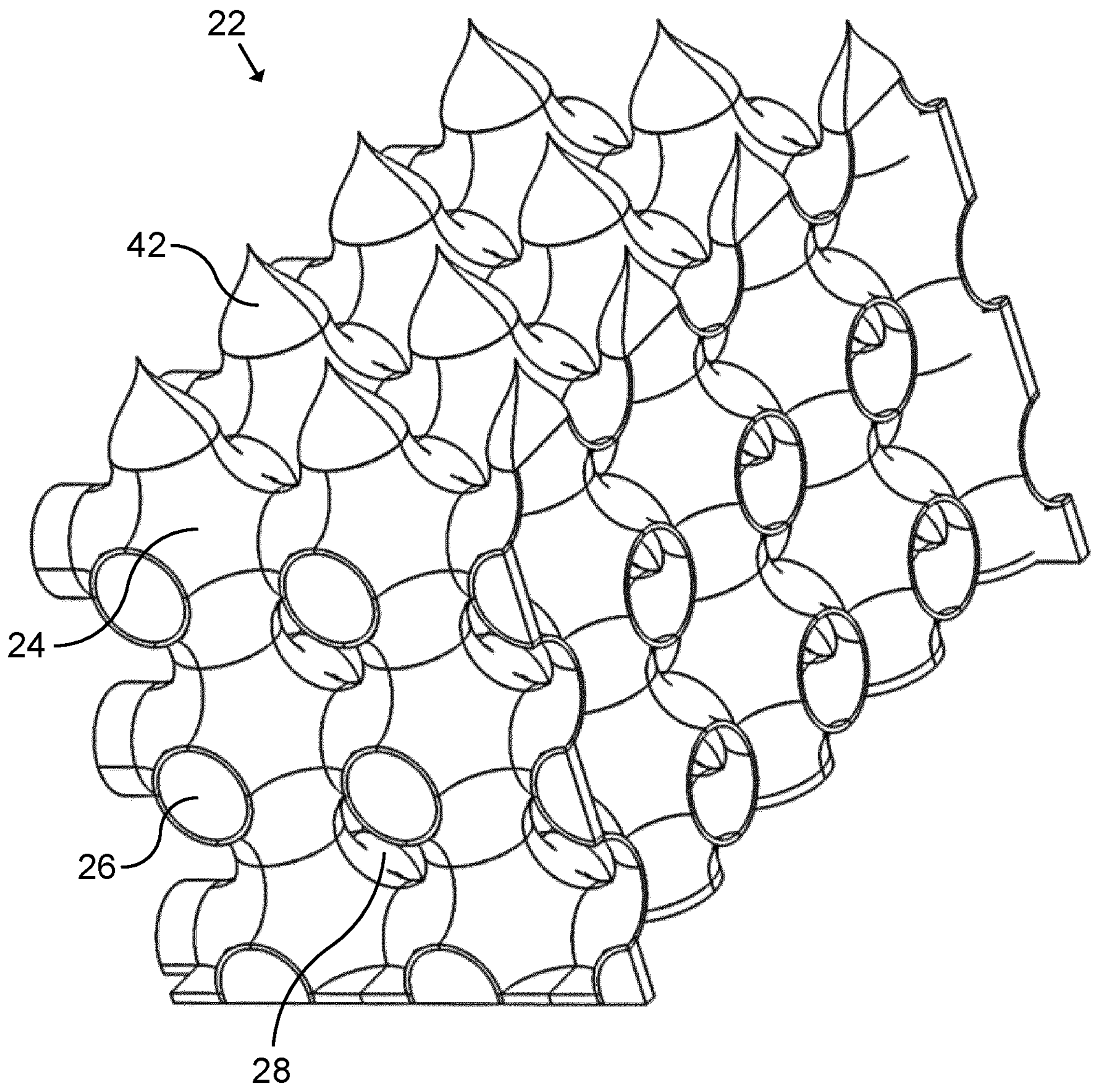
FIG. 2: schematically represents a partial perspective view of a three dimensional lattice cell structure of the heat exchanger in FIG. 1.

FIG. 2 schematically represents a partial perspective view of the three dimensional lattice cell structure 22 of the heat exchanger 12 in FIG. 1. As shown in FIG. 2, the three dimensional lattice cell structure 22 comprises a periodic pattern in each of three orthogonal directions. Each periodic pattern comprises a plurality of periods. The cells 24 are arranged orthogonally in three directions. As shown in FIG. 2, each non-flat and flow-promoting end 42 of this example has a shape of a cone.

Figure 3:
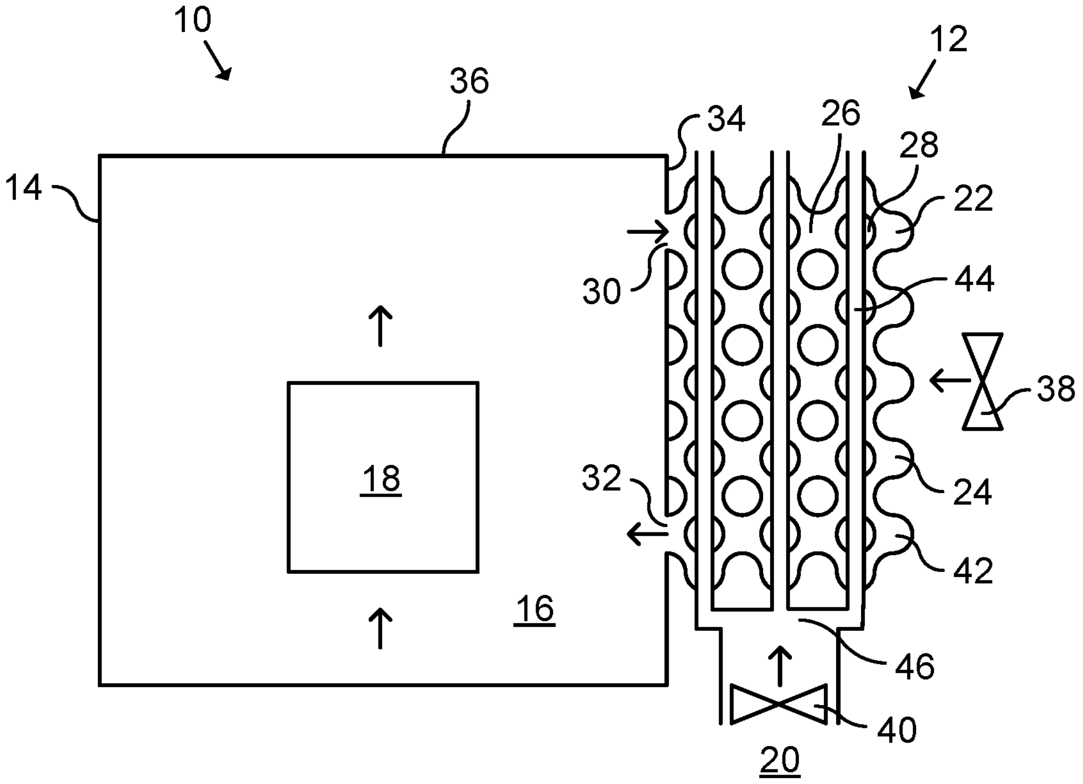
FIG. 3: schematically represents a side view of an electric arrangement comprising a further example of heat exchanger.
Figure 4:
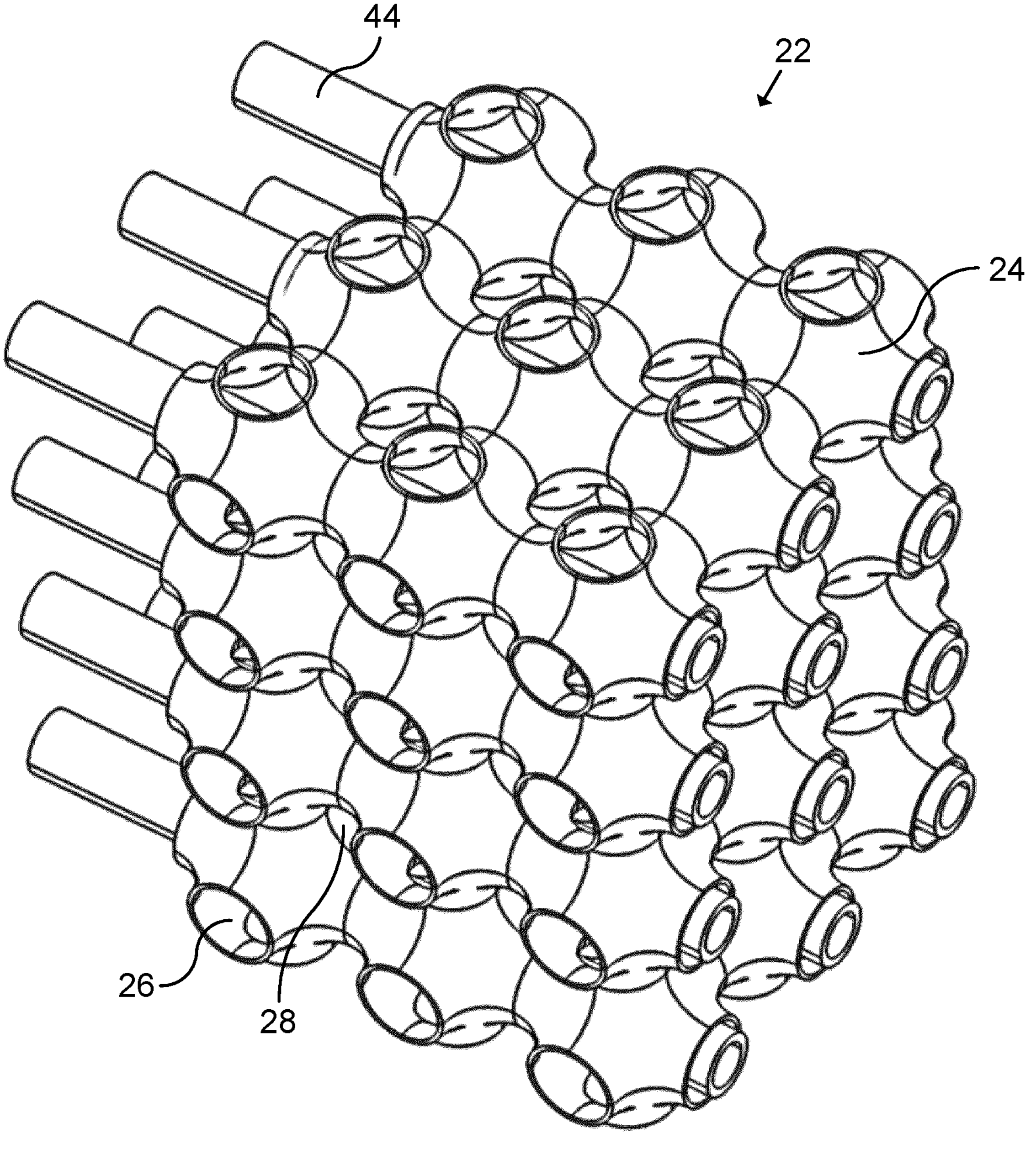
FIG. 4: schematically represents a partial perspective view of the heat exchanger in FIG. 3.

FIG. 3 schematically represents a side view of a power transformer 10 comprising a further example of heat exchanger 12 and FIG. 4 schematically represents a partial perspective view of the heat exchanger 12 in FIG. 3. With collective reference to FIGS. 3 and 4, mainly differences with respect to FIGS. 1 and 2 will be described.

The heat exchanger 12 in FIGS. 3 and 4 comprises a plurality of pipes 44. In this example, each pipe 44 is straight and vertically oriented. The pipes 44 are configured to guide the air 20 through the three dimensional lattice cell structure 22.

Each pipe 44 extends through the entire three dimensional lattice cell structure 22. In this example, each pipe 44 extends through the cells 24 of the three dimensional lattice cell structure 22.

The heat exchanger 12 in FIG. 3 further comprises a manifold 46. The manifold 46 branches into the pipes 44. The bottom fan 40 is arranged to blow air 20 through the pipes 44 via the manifold 46. The front fan 38 is arranged to blow air 20 into the three dimensional lattice cell structure 22 in the same manner as in FIG. 1. Thus, in FIG. 3, heat exchange between the oil 16 and the air 20 takes place both between the interior lattice cell structure volume 26 and the exterior lattice cell structure volume 28 and between the interior lattice cell structure volume 26 and the pipes 44. In this way, heat transfer efficiency between the oil 16 and the air 20 is further increased. The heat exchanger 12 in FIG. 3 also has a simple structure.

The pipes 44 in FIGS. 3 and 4 may alternatively be configured as heat pipes containing two-phase coolant and provided with an interior capillary structure. In this case, the pipes 44 may extend further outside the three dimensional lattice cell structure 22.

Figure 5:
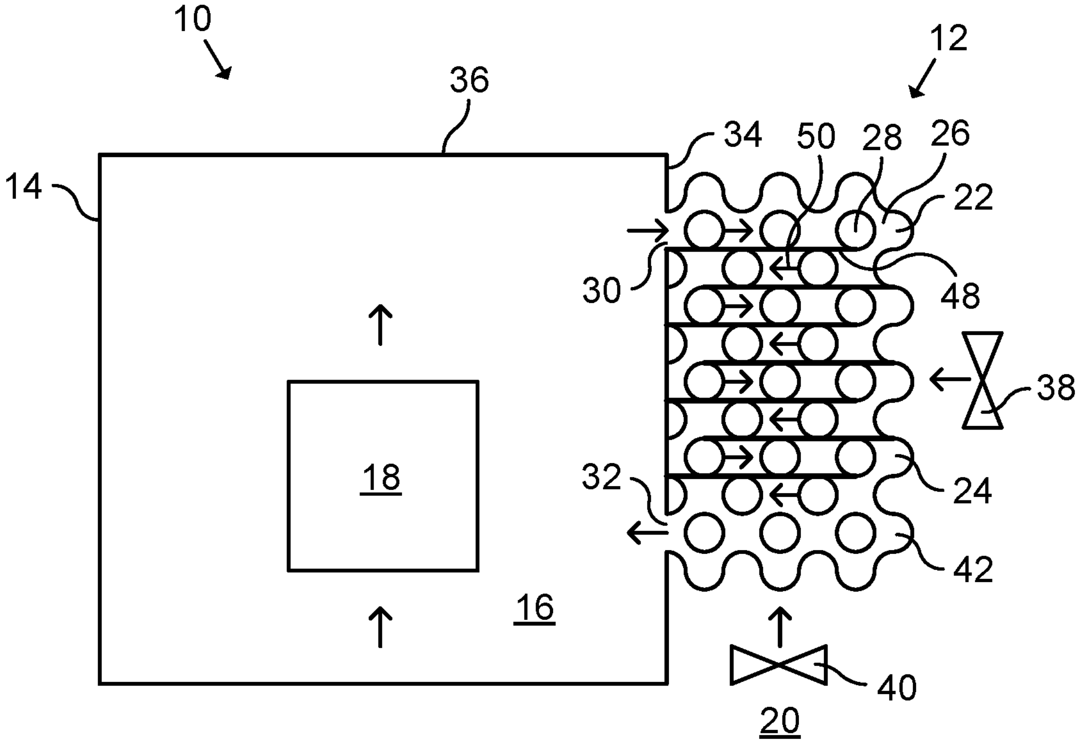
FIG. 5: schematically represents a side view of an electric arrangement comprising a further example of heat exchanger.

FIG. 5 schematically represents a side view of a power transformer 10 comprising a further example of heat exchanger 12. Mainly differences with respect to FIGS. 1 and 2 will be described.

The heat exchanger 12 in FIG. 5 further comprises a plurality of plates 48. The plates 48 define a path 50 inside the interior lattice cell structure volume 26. As shown in FIG. 5, the path 50 is serpentine-shaped. The plates 48 are one example of a guiding structure for guiding the oil 16 inside the three dimensional lattice cell structure 22.

As shown in FIG. 5, the plates 48 force the oil 16 to a distal (with respect to the casing 14) region of the three dimensional lattice cell structure 22. The plates 48 thereby further improve heat transfer between the oil 16 and the air 20 in the three dimensional lattice cell structure 22.

Figure 6:
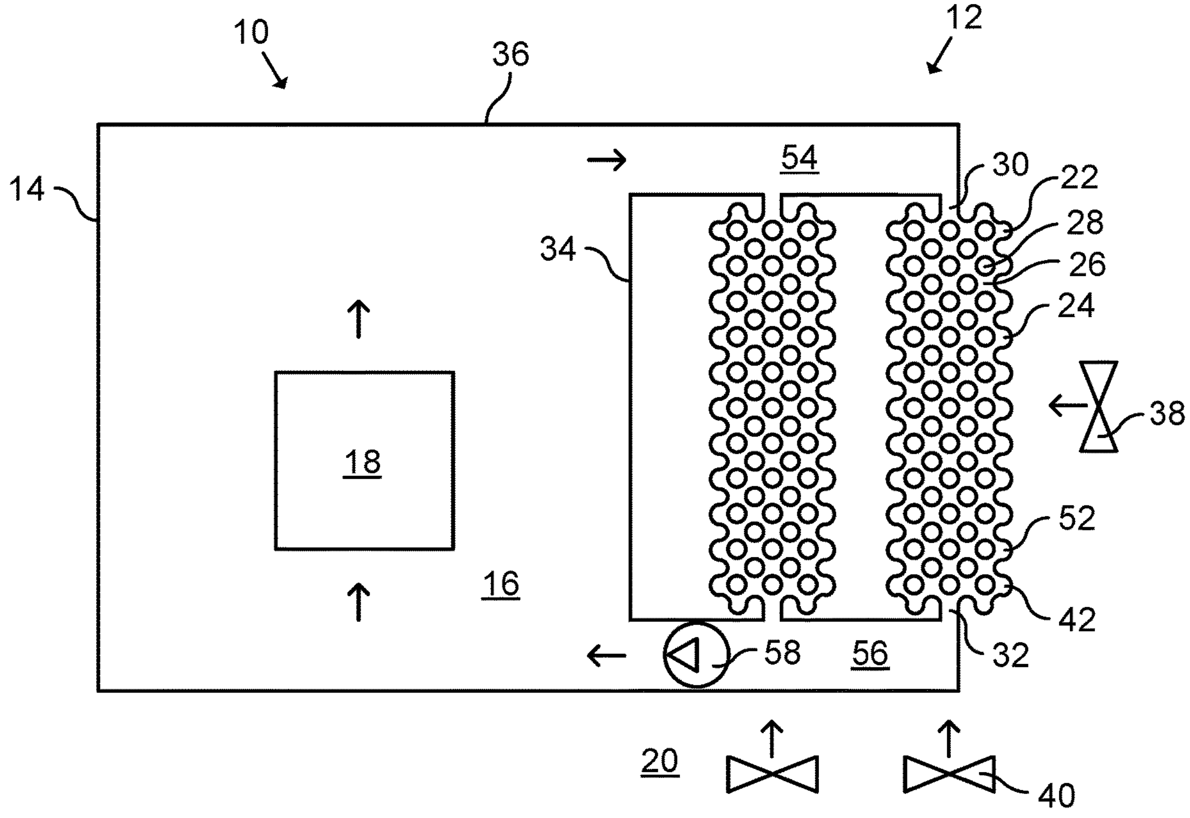
FIG. 6: schematically represents a side view of an electric arrangement comprising a further example of heat exchanger.

FIG. 6 schematically represents a side view of a power transformer 10 comprising a further example of heat exchanger 12. Mainly differences with respect to FIGS. 1 and 2 will be described.

The heat exchanger 12 in FIG. 6 comprises a plurality of bodies 52. Each body 52 comprises a three dimensional lattice cell structure 22. The bodies 52 thus form a plurality of parallel networks for the oil 16. Each three dimensional lattice cell structure 22 is configured to conduct the oil 16 from the casing 14 at the exterior side of the casing 14 for heat exchange with the air 20, and back towards the casing 14 for cooling the electric component 18.

Each body 52 is detachably connectable to the casing 14. The power transformer 10 can function even when one of the bodies 52 is removed for replacement. In this case, openings into the body 52 removed for replacement need to be closed. Replacement of only one body 52 is simpler and cheaper.

The bodies 52 do however not need to be directly connectable to the casing 14. As shown in FIG. 6, the heat exchanger 12 comprises an upper manifold 54 and a lower manifold 56. The upper manifold 54 branches into the inlet 30 of each body 52. The outlet 32 of each body 52 are joined by the lower manifold 56. Each body 52 is detachably connectable to the upper manifold 54 and the lower manifold 56.

The power transformer 10 in FIG. 6 further comprises a pump 58. The pump 58 constitutes one example of a pump arrangement. The pump 58 is configured to selectively enhance a flow of the oil 16 through the three dimensional lattice cell structure 22. The cooling efficiency of the power transformer 10 can easily be regulated by adjusting the speed of the pump 58. In the example in FIG. 6, the pump 58 is arranged in the lower manifold 56, i.e., downstream of the bodies 52.

The power transformer 10 in FIG. 6 further comprises a plurality of bottom fans 40. Each bottom fan 40 is arranged below one of the three dimensional lattice cell structure 22. One bottom fan 40 is associated with each three dimensional lattice cell structure 22.

Figure 7:
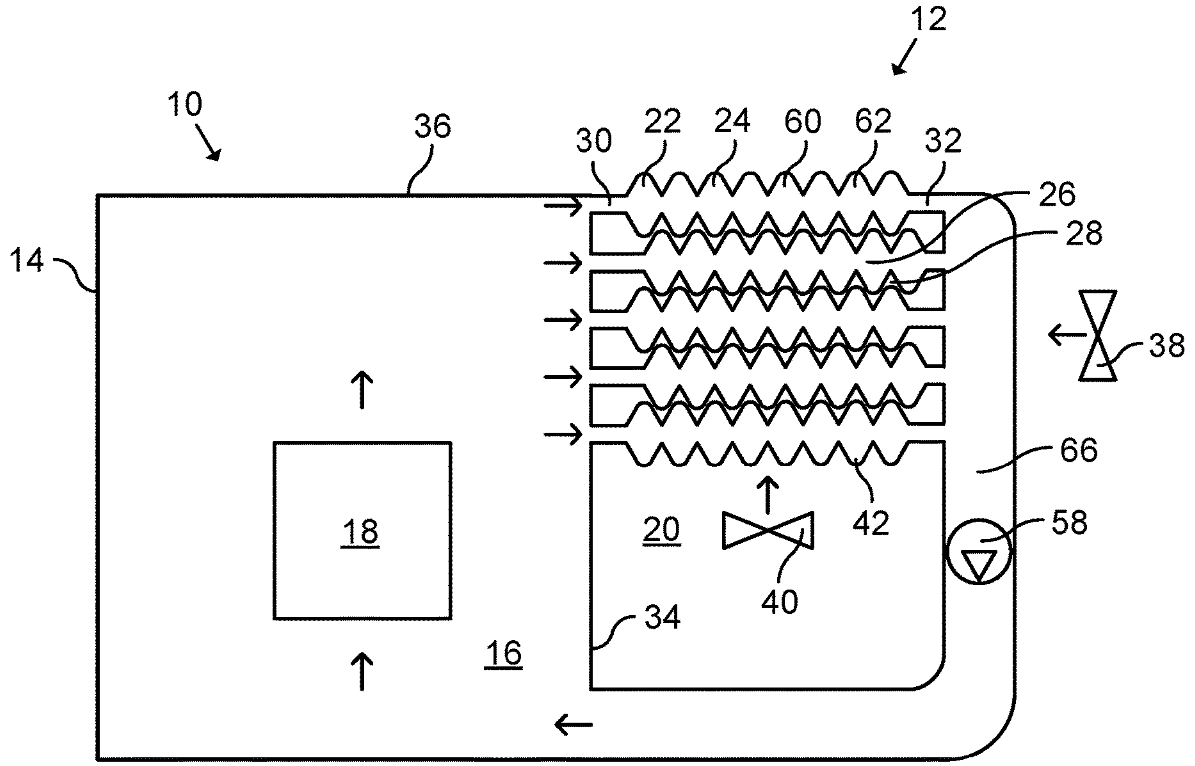
FIG. 7: schematically represents a side view of an electric arrangement comprising a further example of heat exchanger.
Figure 8:
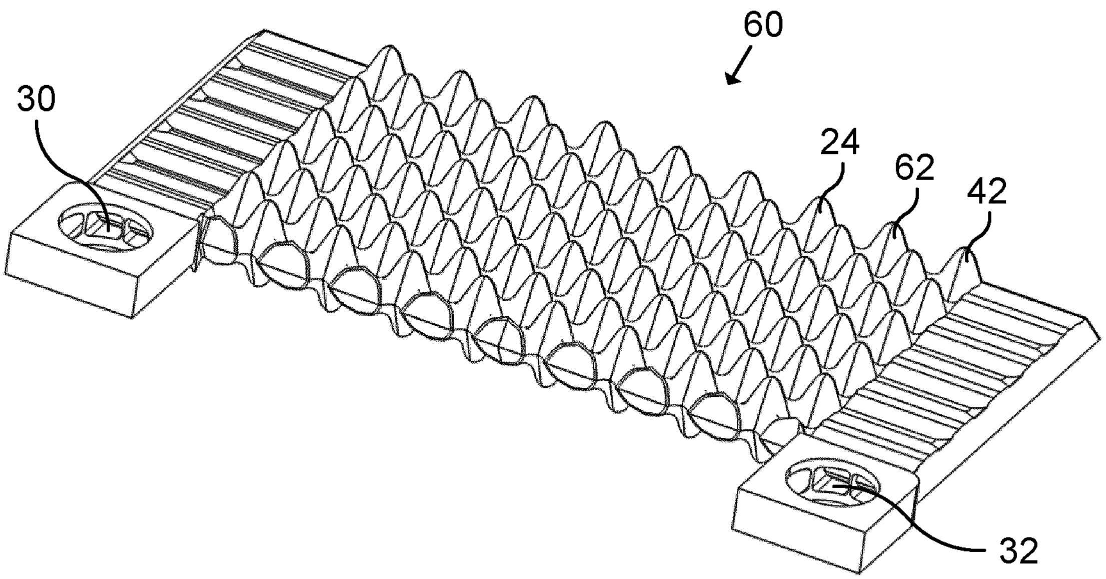
FIG. 8: schematically represents a perspective view of a panel of the heat exchanger in FIG. 7.
Figure 9:
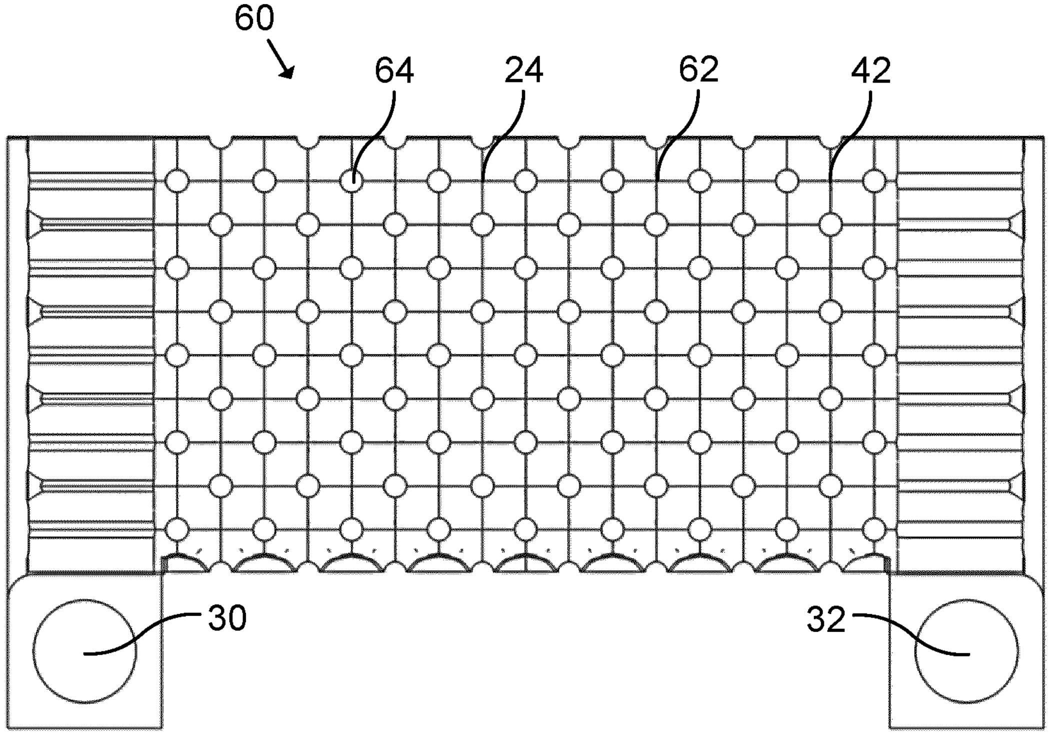
FIG. 9: schematically represents a front view of the panel in FIG. 8.

FIG. 7 schematically represents a side view of a power transformer 10 comprising a further example of heat exchanger 12. The heat exchanger 12 comprises a plurality of panels 60. FIG. 8 schematically represents a perspective view of one of the panels 60 of the heat exchanger 12 in FIG. 7, and FIG. 9 schematically represents a front view of the panel 60 in FIG. 8. With collective reference to FIGS. 7-9, mainly differences with respect to FIG. 6 will be described.

The panels 60 are further examples of bodies according to the present disclosure. Each panel 60 is detachably connectable to the casing 14. Each panel 60 comprises a two dimensional lattice cell structure 62. Furthermore, each panel 60 in this example comprises a plurality of holes 64. The holes 64 are arranged between the cells 24.

The panels 60 are arranged in a stack. In this way, the panels 60 jointly form a three dimensional lattice cell structure 22. The distance between the panels 60 may be varied, e.g., optimized for an improved heat transfer. As shown in FIG. 7, each panel 60 is horizontally oriented. In the example in FIGS. 7-9, the interior lattice cell structure volume 26 is discontinuous. The three dimensional lattice cell structure 22 thus forms a plurality of parallel labyrinth networks for the oil 16, i.e., one network in each panel 60.

By means of the holes 64, the exterior lattice cell structure volume 28 is continuous. However, the panel 60 does not need to comprise the holes 64, for example if the panel 60 is made of sheet metal. In this case, the exterior lattice cell structure volume 28 would be discontinuous between the panels 60.

The panels 60 are arranged in a dense configuration. In this example, the panels 60 are overlapping. That is, cells 24 of one panel 60 enter into respective spaces between cells 24 of an adjacent panel 60. Thus, the cells 24 of adjacent panels 60 are offset.

As an alternative, the non-flat ends 42 of the panels 60 may be replaced with flat ends. In this case, the panels 60 may be compactly arranged face-to-face with each other and the cells 24 of adjacent panels 60 do not need to be offset.

The heat exchanger 12 further comprises a conduit 66. The outlet 32 of each panel 60 is connected to the conduit 66. The conduit 66 transitions (as seen in the flow direction of the oil 16) from vertical to horizontal prior to connecting to the casing 14. The pump 58 is arranged in the conduit 66, here in the vertical section thereof. The bottom fan 40 is arranged vertically between the three dimensional lattice cell structure 22 and the horizontal section of the conduit 66.

The panel 60 according to FIGS. 8 and 9 is merely one specific example. In particular, the design of the inlet 30 and the outlet 32 may be modified.

Figure 10:
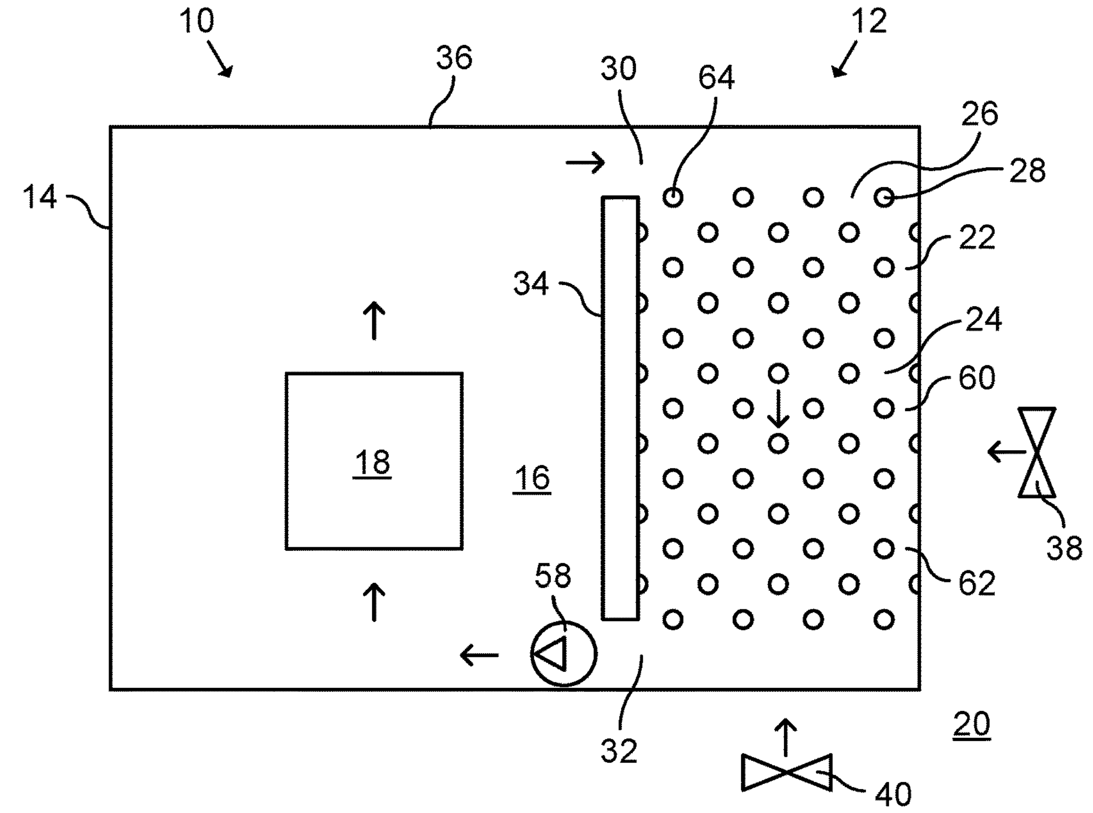
FIG. 10: schematically represents a side view of an electric arrangement comprising a further example of heat exchanger.
Figure 11:
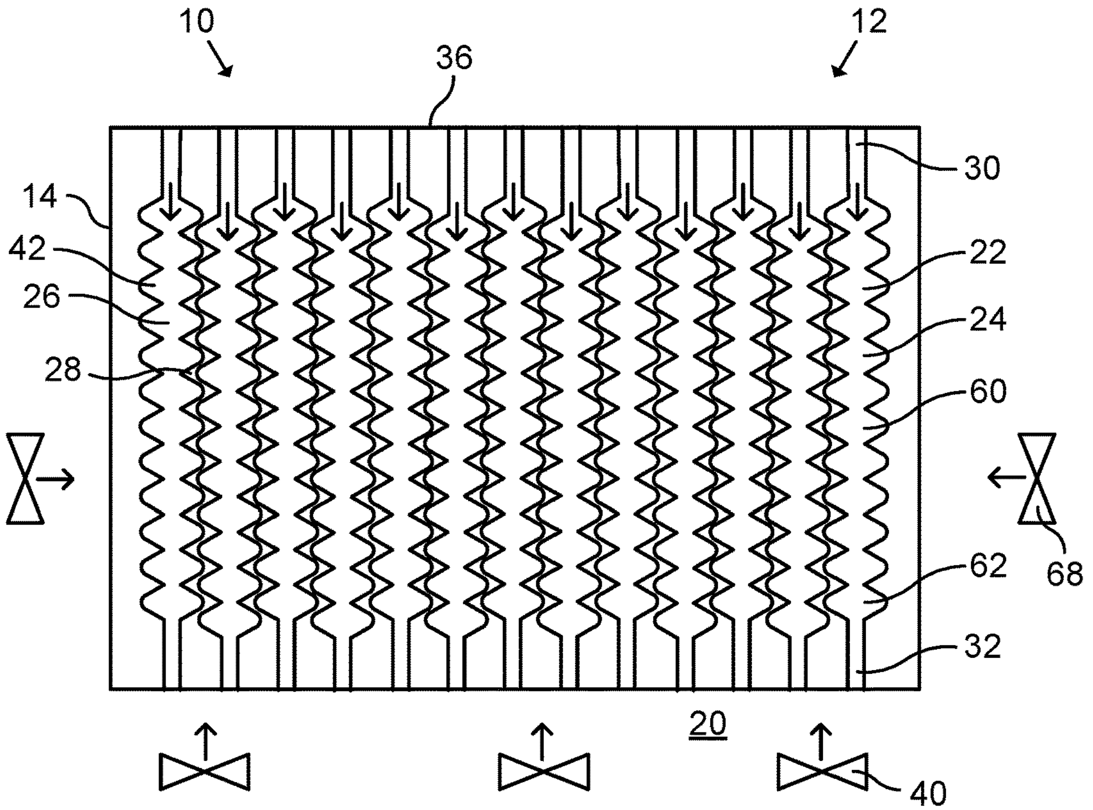
FIG. 11: schematically represents a front view of the electric arrangement in FIG. 10.

FIG. 10 schematically represents a side view of a power transformer 10 comprising a further example of heat exchanger 12 and FIG. 11 schematically represents a front view of the power transformer 10 in FIG. 10. With collective reference to FIGS. 10 and 11, mainly differences with respect to FIG. 7 will be described.

The panels 60 used in FIGS. 10 and 11 are of the same type as in FIGS. 8 and 9. As shown in FIGS. 10 and 11, each panel 60 is vertically oriented. The panels 60 are arranged in a stack to jointly form a three dimensional lattice cell structure 22.

FIG. 11 further shows that the fan arrangement comprises two further fans 68. Each fan 68 is arranged to blow the air 20 into the three dimensional lattice cell structure 22 in a horizontal direction, perpendicular to the blowing direction of the front fan 38.

While the present disclosure has been described with reference to exemplary embodiments, it will be appreciated that the subject matter as claimed is not limited to what has been described above. For example, it will be appreciated that the dimensions of the parts may be varied as needed. Accordingly, it is intended that the subject matter as claimed may be limited only by the scope of the claims appended hereto.

The invention claimed is:

1. An electric arrangement comprising:
- a casing;
- a heat generating electric component arranged inside the casing; and
- a heat exchanger comprising a three dimensional lattice cell structure,
- the three dimensional lattice cell structure being arranged to conduct a dielectric cooling fluid from the casing at an exterior side of the casing for heat exchange with an ambient fluid, and back towards the casing for cooling of the electric component,
- the three dimensional lattice cell structure further comprising:
  - a plurality of cells each comprising a plurality of openings in fluid communication with openings of adjacent cells in three orthogonal directions; and
  - a plurality of ends closing respective cells of the three dimensional lattice structure to contain the dielectric cooling fluid within the three dimensional lattice cell structure and to promote flow of the ambient fluid around the plurality of ends, wherein the plurality of ends are substantially conical.

2. The electric arrangement according to claim 1, wherein the heat exchanger comprises a plurality of bodies, each body comprising a three dimensional lattice cell structure or a two dimensional lattice structure.

3. The electric arrangement according to claim 2, wherein each body is detachably connected to the casing.

4. The electric arrangement according to claim 2, wherein each body is a panel comprising a two dimensional lattice cell structure.

5. The electric arrangement according to claim 4, wherein the panels are arranged in a stack to form the three dimensional lattice cell structure.

6. The electric arrangement according to claim 1, wherein the three dimensional lattice cell structure comprises a triply periodic substantially minimal surface.

7. The electric arrangement according to claim 1, wherein the three dimensional lattice cell structure comprises non-flat and flow-promoting ends.

8. The electric arrangement according to claim 1, wherein the heat exchanger comprises two three dimensional lattice cell structures arranged in parallel, and wherein each three dimensional lattice cell structure is arranged to conduct the cooling fluid from the casing at the exterior side of the casing for heat exchange with an ambient fluid, and back towards the casing for cooling of the electric component.

9. The electric arrangement according to claim 1, wherein the heat exchanger further comprises pipes for conducting the ambient fluid through the three dimensional lattice cell structure.

10. The electric arrangement according to claim 1, wherein the heat exchanger comprises a guiding structure inside the three dimensional lattice cell structure, the guiding structure being arranged to guide the cooling fluid along a defined path inside the three dimensional lattice cell structure.

11. The electric arrangement according to claim 1, further comprising a pump arrangement arranged to generate a flow of the cooling fluid through the three dimensional lattice cell structure.

12. The electric arrangement according to claim 1, further comprising a fan arrangement arranged to generate a flow of the ambient fluid in the three dimensional lattice cell structure.

13. The electric arrangement according to claim 12, wherein the fan arrangement is arranged to generate a flow of the ambient fluid in the three dimensional lattice cell structure in at least two different directions.

14. The electric arrangement according to claim 1, wherein the electric arrangement is a high voltage static electric induction system.

15. The electric arrangement of claim 1, wherein each cell of the plurality of cells further comprises:
- a first pair of opposite first openings arranged along a first axis, wherein at least one third opening is connected to an opposite first opening of an adjacent cell in the three dimensional lattice cell structure;
- a second pair of opposite second openings arranged along a second axis perpendicular to the first axis, wherein at least one second opening is connected to an opposite second opening of an adjacent cell in the three dimensional lattice cell structure; and
- a third pair of opposite third openings arranged along a third axis perpendicular to the first axis and the second axis, wherein at least one third opening is connected to an opposite first opening of an adjacent cell in the three dimensional lattice cell structure,
- wherein the electric arrangement further comprises a the plurality of ends are coupled to a plurality of first openings, second openings, and third openings of the plurality of cells.

* * * * *